No. 781,514. PATENTED JAN. 31, 1905.
W. GRAY.
MOLD FOR FORMING FENCE POSTS, &c.
APPLICATION FILED JUNE 22, 1904.
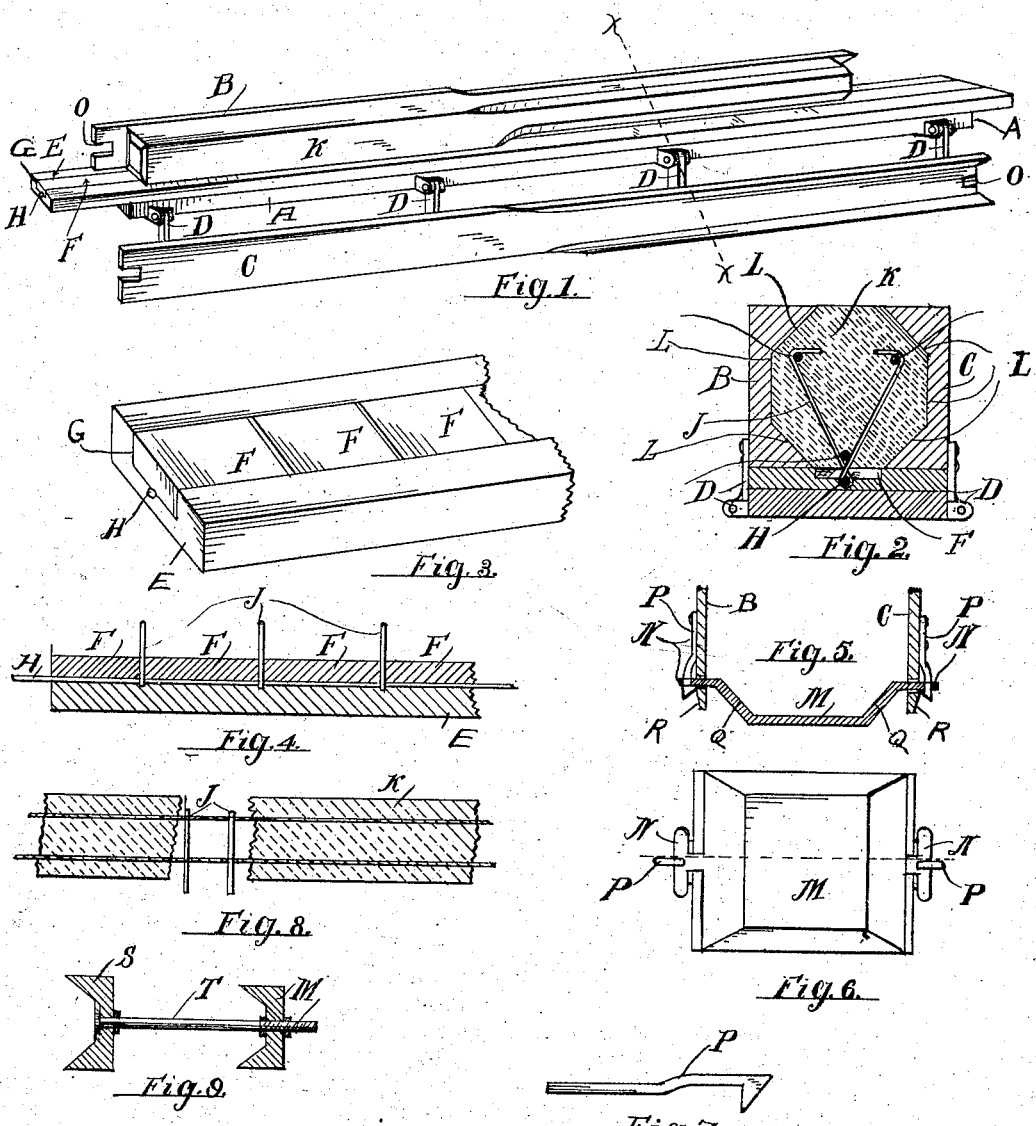

No. 781,514. Patented January 31, 1905.

UNITED STATES PATENT OFFICE.

WILLIAM GRAY, OF MARSHALL, MICHIGAN.

MOLD FOR FORMING FENCE-POSTS, &c.

SPECIFICATION forming part of Letters Patent No. 781,514, dated January 31, 1905.

Application filed June 22, 1904. Serial No. 213,696.

*To all whom it may concern:*

Be it known that I, WILLIAM GRAY, a citizen of the United States, residing at Marshall, in the county of Calhoun and State of Michigan, have invented new and useful Improvements in Molds for Forming Fence-Posts and other Articles, of which the following is a specification.

This invention relates to a new and improved mold for the construction of fence-posts or other articles made of cement or other plastic material; and the invention consists of the combination and arrangement of parts hereinafter described and claimed.

The objects of the invention are, first, to furnish a mold from which a fence-post or an analogous article may be constructed quickly and readily from plastic material; second, to provide a mold with which fence-posts of different lengths can be constructed in the same mold; third, to provide a mold for fence-posts which will allow the cement base to be removed from the mold almost immediately after the mold has been filled with the plastic material; fourth, to combine with a mold having a base and hinged sides a false bottom adapted to support the cement while in process of setting and to form a part of the mold itself and which allows the cement post to be removed from the mold upon the said false bottom; fifth, other objects hereinafter pointed out and claimed. These objects I accomplish by means of the mechanism illustrated in the accompanying drawings, in which—

Figure 1 shows a perspective view of a mold constructed in accordance with my invention, the view showing the mold opened and with the end caps removed. Fig. 2 shows a cross-section of the mold closed with a cement post therein, the same being taken through the center of one of the hinges and the wire staple. Fig. 3 shows a perspective view of what I term the "false bottom," showing the position of the movable blocks in a groove in the said false bottom. Fig. 4 shows a longitudinal sectional view through the center of Fig. 3. Fig. 5 shows a sectional view of one of the end plates which close the ends of the molds, showing the springs which hold the end plates to the mold. Fig. 6 shows an end view of the mold closed with the cap in position thereon. Fig. 7 shows a detail view of the spring which attaches the cap to the side walls of the mold. Fig. 8 shows a longitudinal section of a post constructed in accordance with my invention, showing the staples and wire core. Fig. 9 shows a device for making a shorter post with the same mold.

Similar letters refer to similar parts throughout the several views.

This mold is made preferably of metal, with the exception of the false bottom hereinafter described, which is preferably made of wood, and the mold is adapted more especially for the construction of cement fence-posts provided with a wire core and with staples connected to the wire core and having eyes or loops for receiving the wire of the fence; but the main features of the invention may be used for other articles made of cement or plastic material.

In the drawings, A shows the base of the mold, which is a longitudinal strip of any suitable length.

B and C are the side pieces of the mold or side walls, which in the example of my invention shown in the drawings are hinged to the base A by means of hinges having sufficient length of shank to bring the side pieces when closed so as to engage or come in close proximity with the false bottom hereinafter described.

D and D are the hinges, which in the example of my invention shown in the drawings connect the side pieces B and C to the base A. Instead of using the hinges shown in the drawings any suitable means for securing or connecting the side pieces to the base-piece which will bring the side pieces in the proper position to engage the false bottom may be used.

E is what I call the "false bottom," which is preferably made of wood and which may be, if desired, somewhat longer than the side pieces and base of the mold. This false bottom E is provided with a groove G, extending centrally therethrough, as shown in the drawings, which is adapted to receive the movable blocks F F. These blocks F F are made so as to lie flush with the upper surface of the false bottom when they are in position, and they are of such length as to regulate the position of the staples in the fence-post. In the center of the groove G there is a small groove, (shown by H,) which groove is adapted to receive a wire. In use the false bottom is laid upon the base of the mold, the blocks F F are placed in the required position, and the staples are placed between the blocks, which receive and hold the staples in position. The wire I is then inserted in the groove H, passing through the eyes of the staples, which retains the staples in position during the operation of making the block. When the wire core is used, the staples are engaged with the core also, so that the core is secured to the staples after the cement or plastic material has been placed in the mold. The staple is shown by J.

K represents the cement post. This post may be constructed of any suitable plastic material which is adapted to fill the mold and become hardened into the appearance of stone. The upper end of the post is preferably octagonal in shape, although it may be made of any suitable form.

In the drawings I have shown the side pieces B and C for a portion of their length provided with the inclined surfaces shown by L L L L, which fashion when the mold is closed the form of the perfected post.

M shows one of the end plates. These end plates are adapted to close the end of the mold and are made substantially alike, excepting that at the butt of the post the plate is larger than at the top of the post.

N and N are projections, lugs, or tongues on the end plate M, which are adapted to fit into the slots O of the side pieces B and C, said slots O receiving the said tongues or lugs.

P and P are springs which hold the cap in place on the mold.

Q and Q show the form of the inner surface of the plate which fashions the top or butt of the post.

The side plates are beveled on their outer faces at each end, as shown by R R, so that when the caps or end pieces are fitted into place the projections N N ride upon the beveled ends R R and draw the side pieces closely to the end plates M, thereby making a tight joint.

In order to make a short post with the same mold, I provide a block (shown by S) which fits into the mold between the side pieces B and C and which is supported in position by the rod or tongue T, which rod T is connected with one of the end plates.

In using my mold the side pieces are raised into position at right angles to the base, the false bottom is placed in position so as to form for the time being a bottom of the mold proper, the staples are placed in position between the blocks F F and the eyes rest in the small groove G, and the wire I is inserted to retain the same in position. The ends of the mold are now secured in place and the mold is filled with the plastic material, which quickly sets sufficiently to allow the mold to be opened and the uncured post to be removed immediately upon the false bottom. By this construction of mold the plastic post may be immediately removed and the molds used in connection with another false bottom, so that the operation of making posts with the mold is very rapid.

I have described and shown my preferred form of making the mold for the construction of fence-posts or other articles. It will be evident, however, that variations may be made in form and shape without departing from the spirit of the invention.

Having thus described my invention, what I claim to have invented, and desire to secure by Letters Patent of the United States, is—

1. In a mold for molding articles from plastic material, the combination of a base, a side piece at either side suitably connected to the base, a movable end piece at either end of the side pieces, and a false bottom having means detachably connected thereto for securing the staples to engage with the post resting on said base and extending beyond the surfaces at either end of the mold.

2. In combination with a base, two side pieces suitably connected thereto, end pieces closing the ends of the mold, a false bottom extending beyond the ends of the side pieces and provided with a longitudinal groove on its upper surface, a plurality of blocks fitting into said grooves, the upper surface of said blocks lying substantially flush with the upper surface of said false bottom.

3. In combination with a base, a side piece at either side of the base hinged to said base, a movable end piece at either end of the mold connecting the ends of the side pieces, a false bottom resting on the upper surface of the said base and extending at either end beyond the side pieces and provided with a longitudinal groove, and the suitable groove H, and a plurality of blocks fitting into the groove H when the mold is in position to receive the plastic material, and removable therefrom when the case has been taken from the mold.

4. The combination of the base, the side pieces hinged thereto, end pieces movably connected to the ends of the side pieces, a false bottom longer than the side pieces and resting on the base, a longitudinal groove in the upper surface of said false bottom, a plurality of blocks fitted into said groove and a plurality of staples held in position between said blocks while the mold is being filled with plastic material.

5. In combination with a base having hinged side pieces of a false bottom of a mold having a longitudinal groove in the upper surface, and a smaller groove in the bottom of the wider groove, a plurality of blocks fitting into the wider groove, a plurality of staples sustained in position within the mold, each staple having an eye part within said small groove, and a suitable device extending through the eyes of said staples.

6. In a mold for making fence-posts from plastic material, a base having a false bottom including a plurality of spaced sections, side pieces hinged to the base, end pieces closing the space between the ends of the side pieces, a follower S supported within the mold at a distance from one end thereof, and a suitable connection between the follower and end piece, substantially as described.

In testimony whereof I have hereunto set my hand in presence of two subscribing witnesses.

WILLIAM GRAY.

Witnesses:
EDWARD R. MONROE,
EDWARD TAGGART.